(12) United States Patent
Ohlenschlaeger

(10) Patent No.: US 11,925,884 B2
(45) Date of Patent: Mar. 12, 2024

(54) FLOTATION DEVICE

(71) Applicant: Valmet Technologies Oy, Espoo (FI)

(72) Inventor: Peter Ohlenschlaeger, Kaiserslautern (DE)

(73) Assignee: Valmet Technologies Oy, Espoo (FI)

(*) Notice: Subject to any disclaimer, the term of this patent is extended or adjusted under 35 U.S.C. 154(b) by 903 days.

(21) Appl. No.: 16/666,258

(22) Filed: Oct. 28, 2019

(65) Prior Publication Data

US 2020/0155971 A1   May 21, 2020

(30) Foreign Application Priority Data

Nov. 19, 2018 (DE) ..................... 10 2018 128 951.0

(51) Int. Cl.
| | |
|---|---|
| *B01D 21/00* | (2006.01) |
| *B01F 23/232* | (2022.01) |
| *B01F 25/312* | (2022.01) |
| *C02F 1/24* | (2023.01) |
| *B01F 101/00* | (2022.01) |

(52) U.S. Cl.
CPC ........ *B01D 21/0084* (2013.01); *B01F 23/232* (2022.01); *B01F 25/312* (2022.01); *C02F 1/24* (2013.01); *B01F 2101/305* (2022.01)

(58) Field of Classification Search
CPC ............ B01D 21/0084; B01D 19/0073; B01F 23/232; B01F 25/312; B01F 2101/305; C02F 1/24; B03D 1/1462; B03D 1/1468; B03D 1/1475; B03D 1/1431; B03D 1/1443; B03D 1/02

See application file for complete search history.

(56) References Cited

U.S. PATENT DOCUMENTS

| | | | | |
|---|---|---|---|---|
| 2,242,139 A | | 5/1941 | Munroe | |
| 3,371,779 A | * | 3/1968 | Hollingsworth | B03D 1/1406 261/87 |
| 3,542,675 A | * | 11/1970 | Kennett | B03D 1/1431 137/98 |
| 3,679,056 A | * | 7/1972 | Haymore | B03D 1/1431 210/221.2 |
| 4,681,682 A | * | 7/1987 | White | B03D 1/1475 210/776 |
| 4,935,154 A | | 6/1990 | Arnold | |
| 5,240,600 A | * | 8/1993 | Wang | C02F 3/26 210/197 |

(Continued)

FOREIGN PATENT DOCUMENTS

| | | |
|---|---|---|
| DE | 202015102572 U1 | 7/2015 |
| GB | 2024192 A | 1/1980 |

(Continued)

*Primary Examiner* — Bradley R Spies
*Assistant Examiner* — Jeannie McDermott
(74) *Attorney, Agent, or Firm* — Katterle Nupp LLC; Paul Katterle; Robert Nupp

(57) ABSTRACT

A flotation device having a flotation tank for receiving liquid to be purified, a saturator for receiving a pressurized liquid-gas mixture and at least one feeder. A line leads from the saturator to the feeder through which the pressurized liquid-gas mixture may be introduced into the flotation tank. The feeder includes a flow channel that has different flow cross sectional areas along the extension thereof. The flow channel may be a Venturi nozzle.

10 Claims, 4 Drawing Sheets

(56) References Cited

U.S. PATENT DOCUMENTS 6,074,557 A * 6/2000 Lyles, Sr. .................. C02F 1/24
                                                                       210/260
2004/0031742 A1    2/2004 Arnaud
2021/0331087 A1* 10/2021 Larnholm .......... B01D 17/0214

FOREIGN PATENT DOCUMENTS

KR          101164660 B1 * 7/2012 ................ C02F 1/24
WO    WO-2018030620 A1 * 2/2018 ............. B63B 25/02

* cited by examiner ced apparatus that automatically mechanically blocks, opens or controls a flow channel in a pneumatic, electrical or electropneumatic manner, superfluous. When the flow cross sectional areas are selected appropriately, the pressure within the line leading away from the saturator can be maintained or even remain constant.

FLOTATION DEVICE

CROSS-REFERENCE TO RELATED APPLICATION(S)

This application claims priority under 35 U.S.C. § 119 to: German Patent Application No.: 10 2018 128 951.0, filed on Nov. 19, 2018, which is herein incorporated by reference.

TECHNICAL FIELD

The present disclosure relates to a flotation device for purifying water.

BACKGROUND

It is known from the prior art to wash gases using water or to perform wet electrostatic separation of said gases, specifically to free them of particles. Water or a washing solution that has absorbed the particles has to be purified in order that it can be available again for a process. Against this background, it is known in particular to use centrifuges that separate suspended matter and particles from the water.

A dense phase or concentrated phase is generally fed to the centrifuge. Although a centrifuge can rotate at up to 3,800 rotations per minute, the quantity of the purification is not particularly good because only larger particles are separated, and the water retains a high fine material fraction.

Approximately 40 to 50% of the particles remain in the purified water. A particular disadvantage when using a centrifuge is that said centrifuge is particularly susceptible to wear and has high maintenance requirements. This is associated with high costs. A further disadvantage is that a plant, even a manufacturing plant, ceases operation for a long time when a centrifuge requires maintenance and corrective maintenance work is required. Furthermore, centrifuges and/or decanters result in high electrical energy consumption.

Against this background, it is known from DE 20 2015 102 572 U1 to use a flotation device for purifying water, which flotation device generates microbubbles of air. The microbubbles entrain particles in the water to the surface thereof. A buoyant floatate, specifically a solid-air-flakes mixture, thus results at the surface.

The microbubbles result when air dissolved in the water escapes from the water owing to a pressure drop. Air is first dissolved in water in a saturator, in that a pressure prevails in the saturator that is significantly above atmospheric pressure. As soon as the pressurized water-air mixture is introduced into the flotation tank via valves, the air escapes in the form of microbubbles, because the water-air mixture is no longer pressurized.

However, using valves, in particular a plurality of valves, is complex in terms of apparatus, since said valves have to be appropriately actuated and also maintained. This is also associated with costs. Furthermore, valves represent potential weak points at which leaks may occur. Furthermore, valves are susceptible to wear.

The disclosure therefore relates to specifying a flotation device, into the flotation tank of which a pressurized liquid-air mixture can be introduced as reliably as possible and as homogeneously as possible.

SUMMARY

In accordance with the disclosure, a flotation device is provided and includes a flotation tank for receiving liquid to be purified, a saturator for receiving a pressurized liquid-gas mixture and at least one feeder. A line leads from the saturator to the feeder via which the pressurized liquid-gas mixture may be introduced into the flotation tank. The feeder comprises a flow channel that has different flow cross sectional areas along the extension thereof.

BRIEF DESCRIPTION OF THE DRAWINGS

The features, aspects, and advantages of the present disclosure will become better understood with regard to the following description, appended claims, and accompanying drawings where:

DETAILED DESCRIPTION OF ILLUSTRATIVE EMBODIMENTS

Figure 1:
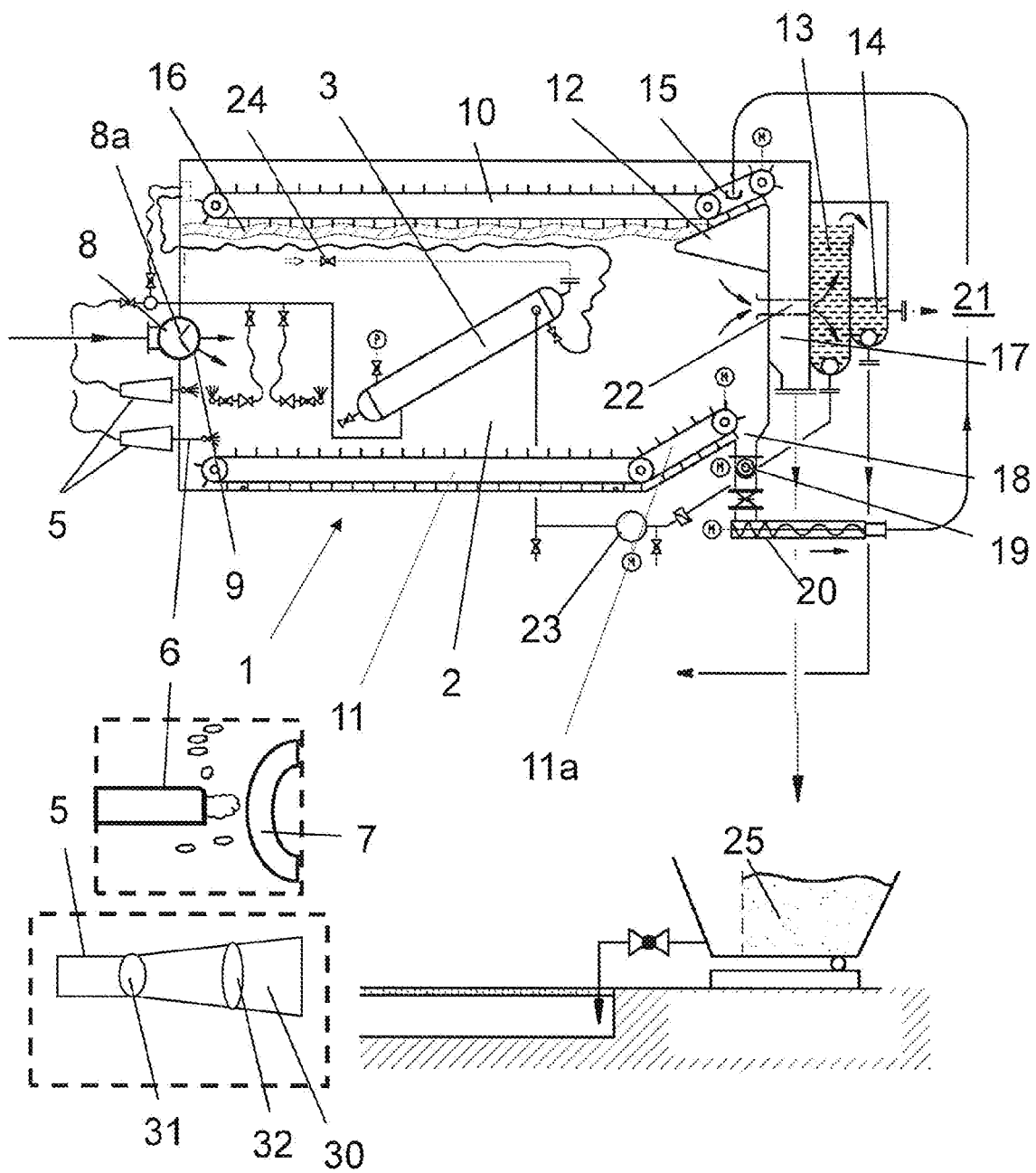
FIG. 1 the top drawing is a partially cross sectional, schematic view of a flotation device, in which Venturi nozzles are used for introducing a liquid-gas mixture into the flotation tank, and the bottom drawing is a cross sectional view of a drainage container that receives the floatate from the flotation device, FIG. 2 the top drawing is a schematic view of a flocculator into which liquid is introduced from a thick matter tank, the bottom left-hand drawing shows a coagulating agent metering device, and the bottom right-hand drawing shows a flocculating agent metering device, FIG. 3 the top drawing is a perspective view of the flotation device according to FIG. 1, and the bottom drawing is a side view of said flotation device, and FIG. 4 the top drawing is a further side view of the flotation device according to FIG. 1, the bottom left-hand drawing is a view of the intake distributor, and the bottom left-hand drawing is a view of the overflow barrier.

It has been found, according to the disclosure, that at least one feeder comprising a flow channel that has different flow cross sectional areas along the extension thereof renders the use of a valve, which automatically mechanically blocks, opens or controls a flow channel in a pneumatic, electrical or electropneumatic manner, superfluous. When the flow cross sectional areas are selected appropriately, the pressure within the line leading away from the saturator can be maintained or even remain constant.

In particular, no substantial pressure loss occurs when the pressurized liquid-gas mixture flows into the liquid already located in the flotation tank. No valves are required for mechanically separating the liquid inside the flotation tank from the pressurized liquid-gas mixture.

As soon as the pressurized liquid-gas mixture flows into the flotation tank, depressurization takes place there, such that microbubbles of the degassing gas generate a floatate at the surface of the flotation tank.

The feeder could comprise or be formed of a Venturi nozzle. Venturi nozzles are particularly suitable for conducting a pressurized liquid-gas mixture into the flotation tank and suitably depressurizing said mixture in the process, such that a pressure drop in a line does not become too great. The Venturi effect is used to omit closing valves.

The line that leads away from the saturator, specifically a distribution line, could extend around the flotation tank at least in portions, the line opening into a plurality of feeders, which are mutually spaced on or in the outer or inner wall of the flotation tank, without interposition of a valve. As a result, the liquid-gas mixture can be introduced into the flotation tank at various points and can generate a floatate that is distributed as homogeneously as possible in the flotation tank.

The feeder or each feeder could open into an injector lance that projects into the inside of the flotation tank, the end of the injector lance projecting into the inside being assigned a convex baffle plate, specifically a baffle distributor. Injector lances make it possible for the liquid-gas mixture to be expediently distributed inside and at depth in the flotation tank. The shaping of the baffle plate causes the outgassing gas to be distributed into fine bubbles when the liquid-gas mixture strikes said plate. The feeder can penetrate the wall of the flotation tank and open into an injector lance. Striking against the baffle plate causes the atmospheric oxygen contained in the two-substance mixture to be vaporized or reduced into small bubbles.

An intake distributor for introducing liquid to be purified may be provided in the flotation tank, the intake distributor extending along an outer or inner wall of the flotation tank at least in part and being provided with slots. An intake distributor makes it possible for the liquid that is to be purified to be introduced or to flow in a homogeneously distributed manner into the flotation tank via the slots, over the entire width of said tank, along a segment.

The slots could be formed as longitudinal slots that are arranged such that the liquid to be purified can be introduced into the flotation tank in a homogeneous manner, at an angle of from 5 to 50° to the horizontal. This results in thorough mixing of the liquid that is already located in the flotation tank. Instead of slots, other passageways, such as holes, oval openings or openings of a different geometry, may also be provided.

A floatate scraper may be arranged in an upper region of the flotation tank.

Alternatively or in addition, a sediment scraper may be arranged in a lower region of the flotation tank. Floatate that has collected at the surface of the liquid, in the flotation tank, can be removed by a floatate scraper. Sediment on the bottom of the flotation tank can be removed by the sediment scraper.

An upper, slanted ramp having a length of preferably 50 to 80 cm can adjoin the floatate scraper, on which ramp the floatate can be deposited by the floatate scraper. Since the ramp is slanted, floatate is drained on the ramp before being discharged to a drainage container.

An overflow barrier in the form of a first tank may be provided, into which already pre-purified liquid can flow before flowing into a second tank. The overflow barrier can expediently adjust the level of the liquid in the flotation tank, such that the floatate scraper can expediently catch and remove the floatate. Adjustment of the overflow barrier makes it possible to adjust requirements corresponding to a dry matter content.

The flotation device described herein can preferably be used in the wood processing industry, in energy production facilities, in the glass or mineral wool industry, or in industry in general.

During use of the described flotation device, it is particularly advantageous for sediment accumulated on the bottom and floatate located at the surface of the liquid to drop into the same drainage container and to already have a relatively high dry content.

FIG. 1 shows a flotation device 1 comprising a flotation tank 2 for receiving liquid to be purified, and a saturator 3 for receiving a pressurized liquid-gas mixture, a line 4, specifically a distributor line, leading from the saturator 3 to at least one feeder 5 via which the pressurized liquid-gas mixture can be introduced into the flotation tank 2.

The feeder 5 comprises, or all the feeders 5 comprise, a flow channel 30 that has different flow cross sectional areas 31, 32 along the extension thereof.

The feeder 5 comprises, or each feeder 5 comprises or is formed as one Venturi nozzle, respectively. This is shown schematically in the bottom left of FIG. 1.

Figure 3:
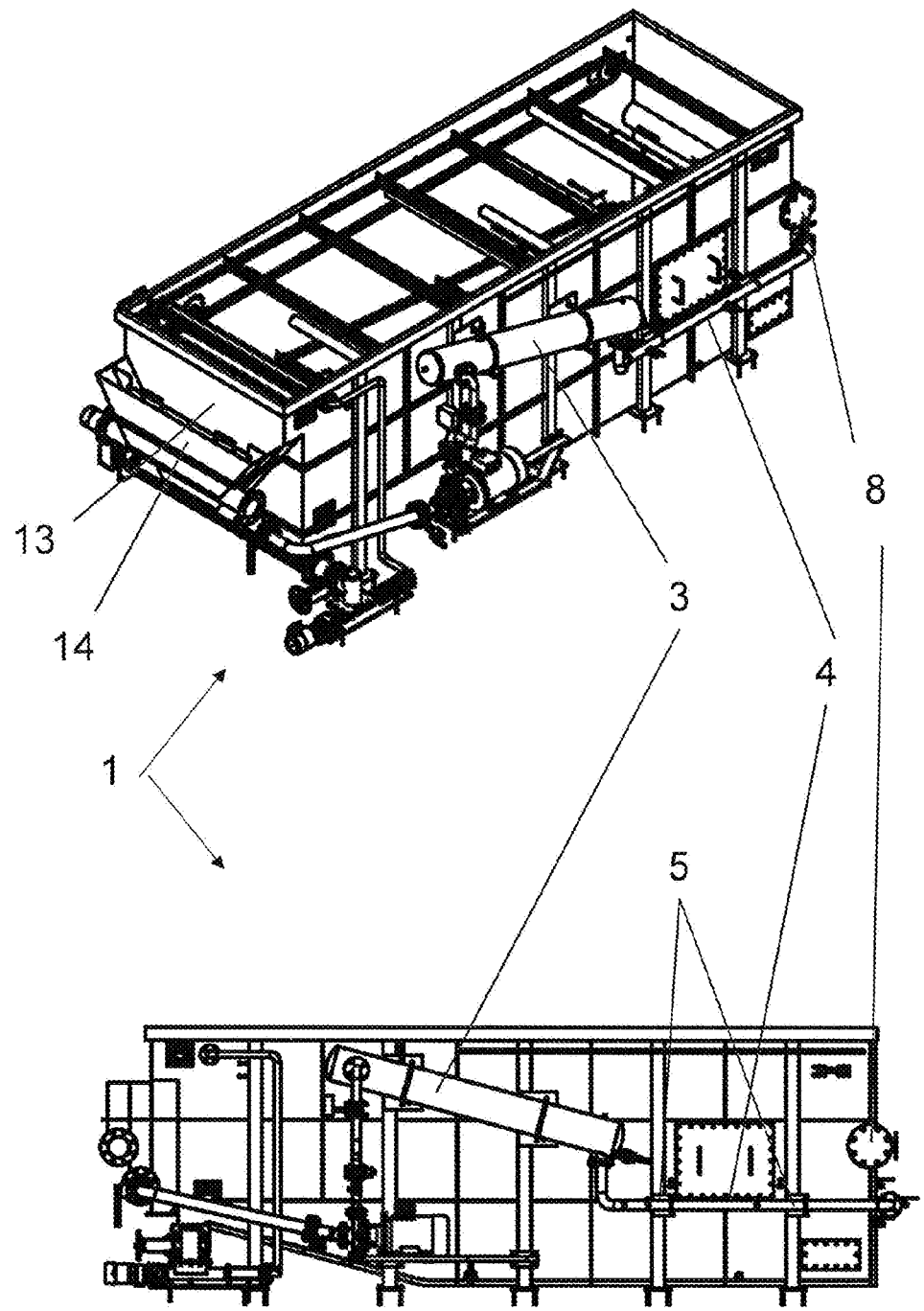

FIG. 3 particularly clearly shows that the line 4 extends around the flotation tank 2 at least in regions, the line 4 opening into a plurality of feeders 5, which are mutually spaced on or in the outer wall of the flotation tank 2, without interposition of a valve.

FIG. 1 shows, in particular in the center, dashed, detail view, that the feeder 5 opens into an injector lance 6 that projects into the inside of the flotation tank 2, the end of the injector lance 6 projecting into the inside being assigned a convex baffle plate 7, specifically a baffle distributor. The convex side of the baffle plate 7 faces the end of the injector lance 6.

A plurality of injector lances 6 are connected to the feeders 5 by means of Venturi nozzles. Very specifically, no valve is provided that defines the connection between the line 4 and the inside of the flotation tank 2. A person skilled in the art would expect that delivering the pressurized liquid from the line 4 into the flotation tank 2 would lead to an immediate pressure drop. As a result, the liquid flowing into the flotation tank 2 would virtually no longer be pressurized, and therefore effective degassing of atmospheric oxygen would not be possible.

Providing the Venturi nozzles keeps the pressure in the line 4 substantially constant, with the result that the pressurized liquid can be introduced into the flotation tank 2 under pressure, on all sides.

The pressurized liquid that is depressurized inside the flotation tank 2 brings about a microbubble effect which entrains particles to the surface of the liquid in the flotation tank 2. A foam, specifically the floatate 16, forms at the surface of the liquid, in which foam particles are concentrated. The saturator 3 is designed as a pressure vessel which, in the example specifically shown, is arranged on the outside of the flotation tank 2.

FIG. 1 furthermore shows that an intake distributor 8 is provided, for introducing liquid to be purified into the flotation tank 2, the intake distributor 8 extending along an outer wall of the flotation tank 2 at least in part and being provided with slots 9. The intake distributor 8 is integrated in the outer wall. This is shown in particular in FIG. 3.

FIG. 1 shows that a distributor structure 8a is provided inside the intake distributor 8, in order to distribute liquid flowing in from the left-hand side, in the drawing plane, over the length of the intake distributor 8. The slots 9 are designed as longitudinal slots that are arranged such that the liquid to be purified can be injected or introduced into the flotation tank 2 so as to be inclined at an angle of from 5 to 50° relative to the horizontal. As a result of the homogeneous introduction of the liquid to be purified, the liquid already located in the container is thoroughly mixed.

A floatate scraper 10 is arranged in an upper region of the flotation tank 2. A sediment scraper 11 is arranged in a lower region of the flotation tank 2.

The floatate scraper 10 is a type of upper conveyor belt. The floatate scraper 10 comprises scraping means that sweep over the liquid surface and supply the floatate 16 to a slanted upper ramp 12. The upper ramp 12 is of such a length that floatate 16 that is located on the ramp 12 can be drained. The upper slanted ramp 12 adjoins the floatate scraper 10 and has a length of 50 to 80 cm, on which the floatate 16 can be deposited by the floatate scraper 10.

An overflow barrier 13 in the form of a first tank is also provided, into which already pre-purified liquid, known as a permeate or a clear phase, can flow, before flowing into a second tank 14.

FIG. 1 further shows that a channel 15 is provided above the upper ramp 12, which channel serves as a sediment distributor. The channel 15 comprises slots or holes, in order that water can flow out of the sediment and back into the flotation tank 2.

With reference to FIG. 1, a purification process preferably takes place in the following manner:

Untreated water or dirty water flows into the intake distributor 8 from the left-hand side, in the drawing plane, and flows from there into the flotation tank 2, at an angle.

A two-substance mixture emerges from the injector lances 6, microfine gas bubbles result and entrain particles to the surface of the liquid in the flotation tank 2.

A floatate 16 is concentrated there, which floatate is deposited on the ramp 12 by the floatate scraper 10 and conveyed from there into a sludge discharge shaft 17. Prior to this, liquid flows from the upper ramp 12 back into the flotation tank 2.

The floatate 16 that is free of liquid is conveyed into the sludge discharge shaft 17. The conveying is achieved by the scraping means of the floatate scraper 10. From the sludge discharge shaft 17, the floatate 16 is guided into a drainage container 25.

The sediment scraper 11, specifically a type of lower conveyor belt, is located on the bottom of the container. The sediment scraper 11 clears sediment from the bottom of the flotation tank 2 and conveys said sediment onto a likewise slanted lower ramp 11*a*. From the lower ramp 11*a*, the sediment drops into a sediment discharge shaft 18.

From there, the sediment is taken to a sediment pump 20 by means of a worm conveyor 19, which pump conveys the sediment into the channel 15 via a sediment line 21. There, the sediment is drained, as described above, via slots in the channel 15.

The liquid flows onto the upper ramp 12 through the slots in the channel 15, and streams from there back into the flotation tank 2. From the channel 15, which is provided, specifically, with longitudinal slots, the sediment then also drops into the sludge discharge shaft 17 and is discharged to the drainage container 25.

An aqueous clear phase, known as the permeate, flows from the flotation tank 2 into the overflow barrier 13, via a clear phase outlet 22. From said overflow barrier, the permeate can overflow into the second tank 14. From the second tank 14, the clear phase can be conducted to another facility.

However, from the overflow barrier 13, a portion of the permeate is taken to the saturator 3, via a permeate pump 23, in which saturator compressed air of below 6 bar is applied to the permeate.

The compressed air is introduced into the saturator 3 from the top, via a compressed-air line 24. At the lower end of the obliquely positioned saturator 3, the pressurized permeate is, as described above, conveyed to the line 4 and from there to the feeders 5.

Figure 2:
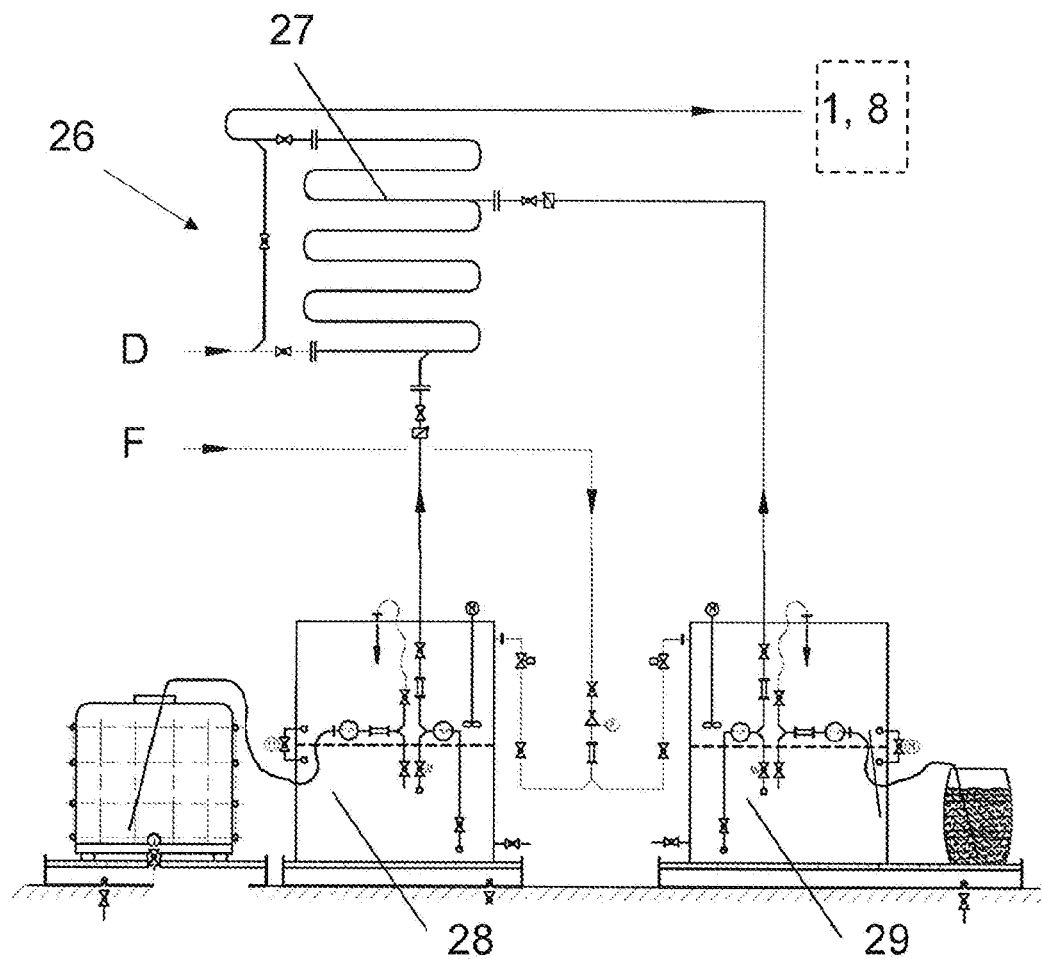

FIG. 2 shows an arrangement positioned upstream of the flotation device 1.

Water to be purified flows from a thick matter tank (not shown) into a flocculator 26. The flocculator 26 advantageously comprises a curved and wound longitudinal line 27, into which coagulating agent can be introduced from a coagulating agent metering device 28.

Figure 4:
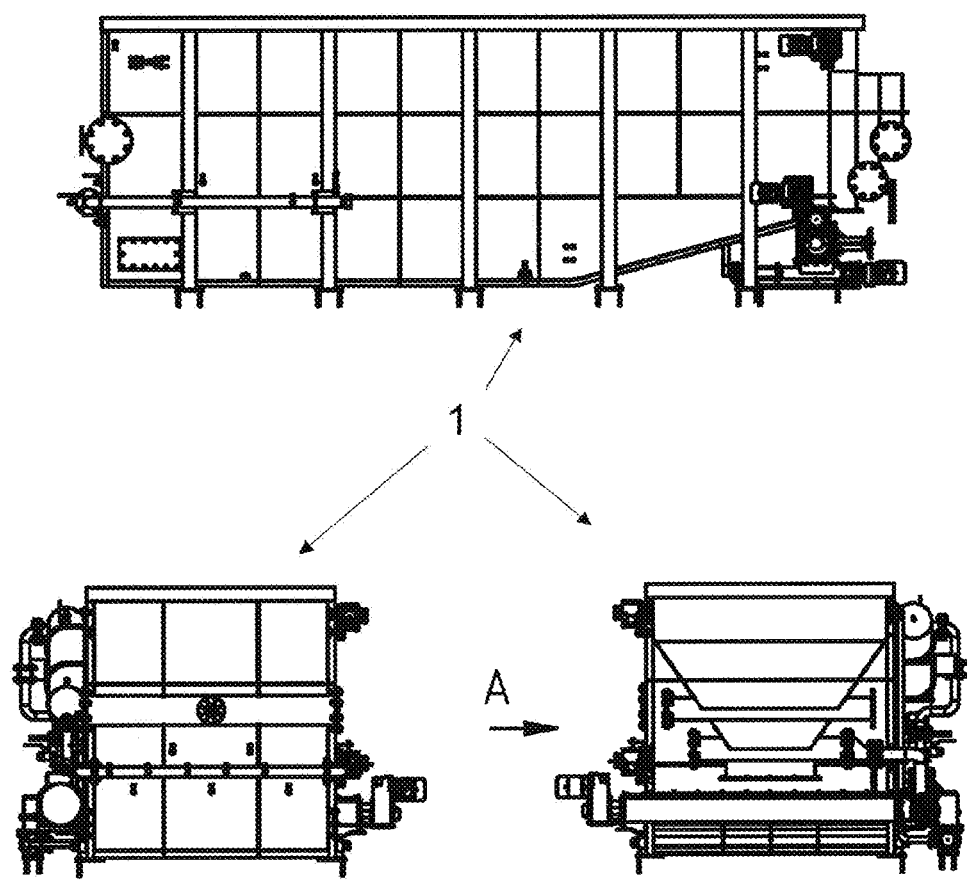

Furthermore, flocking agent is introduced from a flocking agent metering device 29 into the water to be purified, before flowing to the intake distributor 8 of the flotation device 1 according to FIG. 1, 3 or 4.

A coagulating agent chemically breaks bonds, resulting in agglomerations of particles in water that is to be purified.

Furthermore, flocking agents or flocculation agents are fed into the longitudinal line 27, as a result of which physical agglomeration or precipitation of particles is promoted.

The water, thus prepared, is then introduced into the flotation device 1 described herein, according to FIGS. 1, 3 and 4, which device is designed as an HPDF (High Performance Decompression Flotation) flotation device.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. A flotation device comprising:
   a flotation tank for receiving liquid to be purified to form purified liquid;
   a saturator for receiving a pressurized liquid-gas mixture;
   a plurality of feeders mounted on an outer wall of the flotation tank, each feeder comprising a Venturi nozzle disposed exterior to the flotation tank; and
   a line leading from the saturator to the feeders through which the pressurized liquid-gas mixture is introduced into the flotation tank, the line extending at least partially around the flotation tank and opening into the feeders without interposition of valves; and
   a plurality of injector lances connected to the feeders, respectively, the injector lances projecting into an interior of the flotation tank;
   a first tank connected to the flotation tank to receive purified liquid from the flotation tank;
   a second tank connected to the first tank to receive overflow of purified liquid from the first tank; and
   a pump for pumping purified liquid from the first tank to the saturator, where compressed air is applied to the purified liquid;
   wherein ends of the injector lances projecting into the interior of the flotation tank are spaced from convex baffle plates, respectively, the baffle plates having convex sides facing the ends of the injector lances such that when the liquid-gas mixture exits the ends of the injector lances and strikes the baffle plates, outgassing gas is distributed into fine bubbles;
   wherein each feeder comprises a flow channel that has different flow cross sectional areas along the extension thereof; and
   wherein no valve is connected between the line and the interior of the flotation tank.

2. The flotation device according to claim 1, further comprising an intake distributor for introducing liquid to be purified into the flotation tank, the intake distributor extending along an outer or inner wall of the flotation tank at least in part and being provided with slots.

3. The flotation device according to claim 2, wherein the slots are formed as longitudinal slots that are arranged such that the liquid to be purified can be introduced into the flotation tank in a homogeneous manner, so as to be inclined at an angle of from 5 to 50° to the horizontal.

4. The flotation device according to claim 1, further comprising a floatate scraper arranged in an upper region of the flotation tank.

5. The flotation device according to claim 4, further comprising an upper, slanted ramp that adjoins the floatate scraper and upon which floatate may be deposited by the floatate scraper.

6. The flotation device according to claim 4, further comprising a sediment scraper arranged in a lower region of the flotation tank.

7. The flotation device according to claim 1, further comprising a sediment scraper arranged in a lower region of the flotation tank.

8. The flotation device according to claim 1, wherein the flotation device does not include a valve between the line and an interior of the flotation tank.

9. The flotation device according to claim 1, wherein the injector lances are connected to the feeders by the Venturi nozzles, respectively.

10. The flotation device according to claim 4, wherein the first tank operates as an overflow barrier that adjusts the liquid level in the flotation tank to permit the flotate scraper to catch and remove flotate from the flotation tank, whereby adjustment of the first tank allows the dry matter content of the liquid in the flotation tank to be adjusted.

* * * * *